United States Patent
Nakagawa et al.

(10) Patent No.: US 11,948,026 B2
(45) Date of Patent: Apr. 2, 2024

(54) DITHER PATTERN FORMING METHOD, IMAGE PROCESSING APPARATUS, AND IMAGE PROCESSING METHOD

(71) Applicant: CANON KABUSHIKI KAISHA, Tokyo (JP)

(72) Inventors: Junichi Nakagawa, Tokyo (JP); Hirokazu Tanaka, Inagi (JP); Tsukasa Doi, Tokyo (JP); Mayuko Yamagata, Inagi (JP); Satoshi Seki, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/729,212

(22) Filed: Apr. 26, 2022

(65) Prior Publication Data
US 2022/0253656 A1 Aug. 11, 2022

Related U.S. Application Data

(62) Division of application No. 16/921,189, filed on Jul. 6, 2020, now Pat. No. 11,334,778.

(30) Foreign Application Priority Data

Jul. 17, 2019 (JP) .................. 2019-131987

(51) Int. Cl.
*G06K 15/02* (2006.01)

(52) U.S. Cl.
CPC ..... *G06K 15/1876* (2013.01); *G06K 15/1822* (2013.01); *G06K 15/1878* (2013.01)

(58) Field of Classification Search
CPC .......... G06K 15/1876; G06K 15/1822; G06K 15/1878

USPC .......................... 358/1.2, 1.9, 1.15
See application file for complete search history.

(56) References Cited

U.S. PATENT DOCUMENTS

| | | | |
|---|---|---|---|
| 9,064,202 B2 | 6/2015 | Tanaka |
| 9,087,291 B2 | 7/2015 | Hori |
| 9,092,720 B2 | 7/2015 | Nakagawa |
| 9,195,917 B2 | 11/2015 | Nakagawa |

(Continued)

FOREIGN PATENT DOCUMENTS

| JP | H07-177351 | 7/1995 |
|---|---|---|
| JP | 2007-174272 | 7/2007 |

(Continued)

OTHER PUBLICATIONS

Japanese Search Report dated Mar. 28, 2023 in corresponding Japanese Application No. 2019-131987 (English translation available).

*Primary Examiner* — Quang N Vo
(74) *Attorney, Agent, or Firm* — VENABLE LLP

(57) ABSTRACT

Formed is a dither pattern that makes it possible to output an image with excellent dot dispersibility and reduced graininess regardless of controls after quantization processing. To this end, an extended pattern in which multiple divided pixels correspond to each of multiple pixels included in quantization data and one or more of the multiple divided pixels are determined as dot-arrangeable-pixels in which dots can be printed is generated. Thereafter, the thresholds of the dither pattern are set based on the extended pattern in which the dots are arranged to obtain predetermined dispersibility.

20 Claims, 18 Drawing Sheets

(56) References Cited

U.S. PATENT DOCUMENTS

| | | | |
|---|---|---|---|
| 9,210,292 B2 | 12/2015 | Miyake | |
| 9,592,689 B2 | 3/2017 | Yanai | |
| 9,855,774 B2 | 1/2018 | Seki | |
| 9,888,149 B2 | 2/2018 | Suzuki | |
| 10,033,906 B2 | 7/2018 | Nakagawa | |
| 10,225,439 B2 | 3/2019 | Suzuki | |
| 10,769,506 B2 | 9/2020 | Doi | |
| 10,771,657 B2 | 9/2020 | Doi | |
| 2011/0085183 A1* | 4/2011 | Tsuchiya | H04N 1/40068 |
| | | | 358/1.2 |
| 2014/0139885 A1 | 5/2014 | Nakagawa | |
| 2015/0092241 A1* | 4/2015 | Hori | G06K 15/1878 |
| | | | 358/2.1 |

FOREIGN PATENT DOCUMENTS

| | | |
|---|---|---|
| JP | 2013-184316 A | 9/2013 |
| JP | 2014-113819 A | 6/2014 |
| JP | 2016-112892 A | 6/2016 |
| JP | 2017-35814 A | 2/2017 |

\* cited by examiner

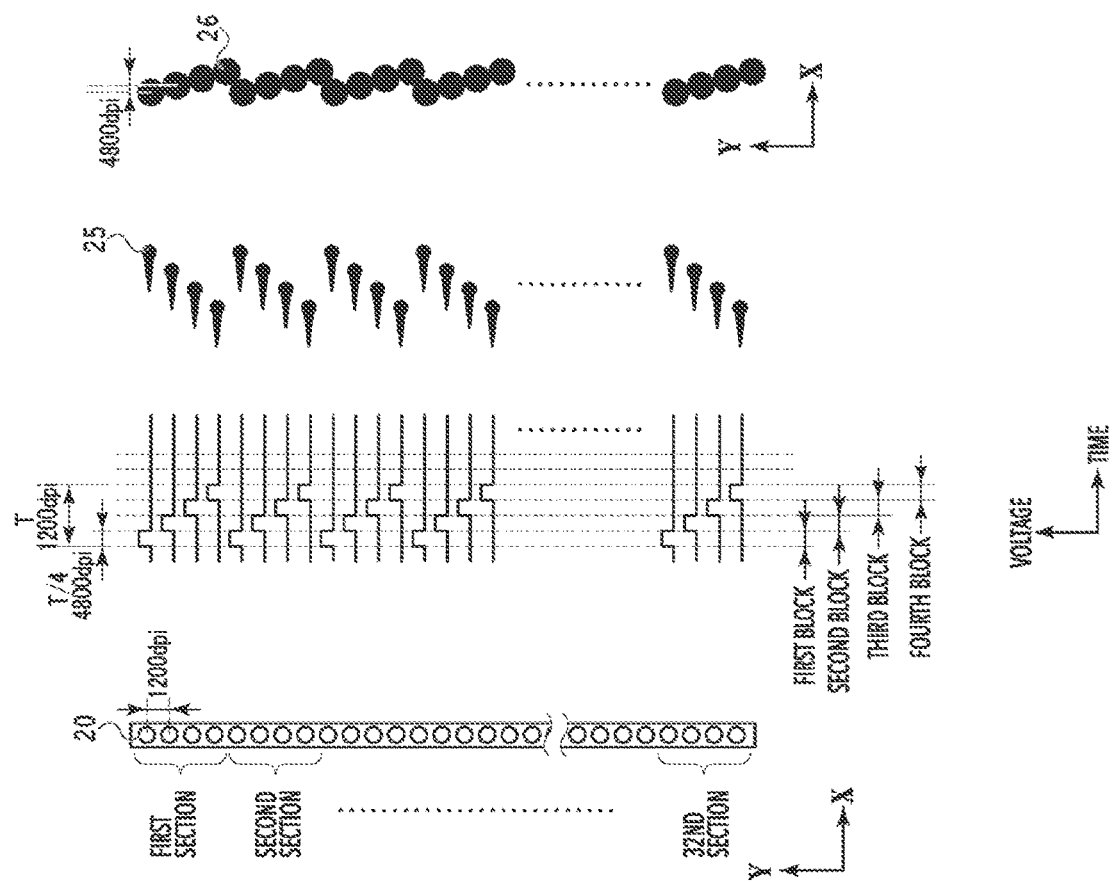

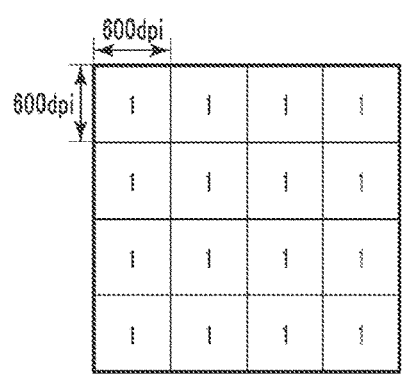 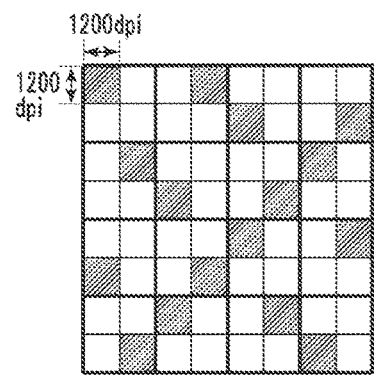 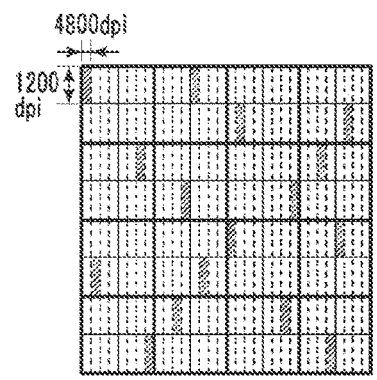
FIG.8A  FIG.8B  FIG.8C

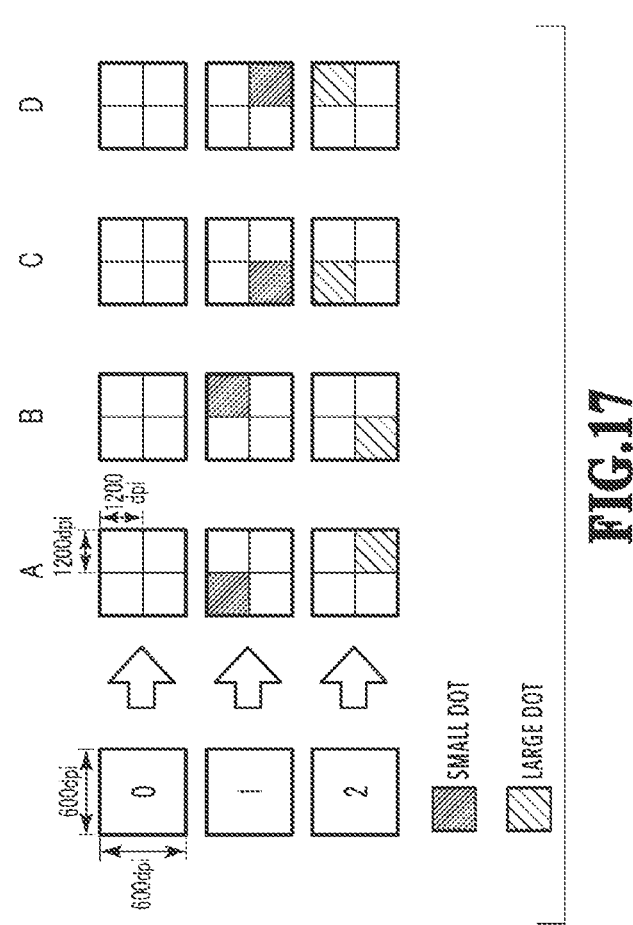

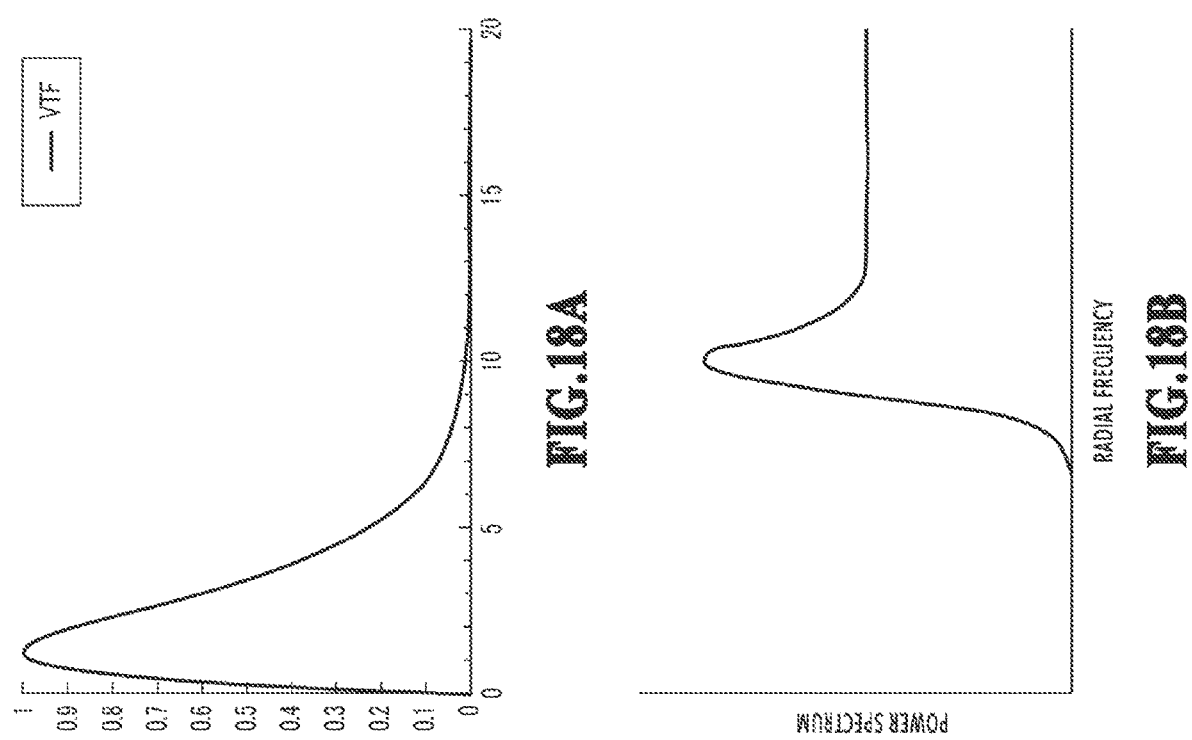

DITHER PATTERN FORMING METHOD, IMAGE PROCESSING APPARATUS, AND IMAGE PROCESSING METHOD

This application is a divisional of U.S. application Ser. No. 16/921,189, filed Jul. 6, 2020, which claims the benefit of Japanese Patent Application No. 2019-131987, filed Jul. 17, 2019, the contents of each of which are incorporated by reference herein.

BACKGROUND OF THE INVENTION

Field of the Invention

The present invention relates to a method of forming a dither pattern to be used in quantization processing, and an image processing apparatus and an image processing method that use the dither pattern.

Description of the Related Art

The error diffusion method and the dithering have been known as quantization methods for expressing an image of multiple gradations in pseudo gradations. Especially, the dithering which determines whether or not to print each dot by comparing the pixel value of image data with a threshold stored in a dither pattern in advance entails a less processing load than that of the error diffusion method and is applied to many image processing apparatuses. Japanese Patent Laid-Open No. H07-177351 discloses a quantization method for arranging dots in a visually favorable manner using a dither matrix prepared in advance. Additionally, Japanese Patent Laid-Open No. 2007-174272 discloses a method of forming a dither pattern for arranging dots in a visually favorable manner.

The blue noise properties have been known as properties of space frequency at which dots are arranged in a visually favorable manner. FIGS. 18A and 18B are diagrams illustrating the blue noise properties and visual properties (VTF: visual transfer function) of human at a reference viewing distance of 250 mm, respectively. In FIGS. 18A and 18B, the horizontal axis represents a frequency (cycles/mm) and indicates that the frequency is lower on the left side and higher on the right side. Meanwhile, the vertical axis represents a power corresponding to the frequency.

With reference to FIG. 18A, the blue noise properties have characteristics such as reduced low frequency components, sharp rising, and flat high frequency components. On the other hand, the visual properties (VTF) of human illustrated in FIG. 18B have a high sensitivity in a low frequency area and a low sensitivity in a high frequency area. That is, the low frequency components are more visible to human eyes, and the high frequency components are less visible to human eyes. In view of the above visual properties, the blue noise properties in visual properties reduce a power in the low frequency area with high sensitivity (more visible) and has a power in the high frequency area with low sensitivity (less visible).

That is, if a dither pattern having the blue noise properties is formed according to the method of Japanese Patent Laid-Open No. 2007-174272, and dots are printed according to a result of quantization using the dither pattern, a comfortable image with reduced graininess can be formed on a printing medium.

However, even if the result of the quantization processing has high dispersibility like the blue noise properties, the arrangement of dots actually printed on the printing medium may not have sufficient dispersibility in some cases due to influence by various controls after the quantization processing.

For example, in a case where a printing apparatus prints dots at higher resolution than the resolution resultant from the quantization processing, a per-pixel area resultant from the quantization processing is associated with multiple pixels at the printing resolution, and dots can be arranged at all the multiple pixels. If the positions of the printing pixels at which the dots are to be actually arranged are changed variously for the sake of control of the printing apparatus or the like, such a variation in the printing positions of the dots in the per-pixel area may cause a loss of the blue noise properties.

Also, in a case where multiple printing elements arrayed in a printing head are driven time-divisionally under a limited power supply capacity, the difference between the driving timings may appear as the position displacement of dots on the printing medium, and this displacement may cause a loss of the blue noise properties.

SUMMARY OF THE INVENTION

The present invention is made with the view to solving the above-described problems. Thus, an object of the present invention is to form a dither pattern that can output an image with excellent dot dispersibility and reduced graininess regardless of controls after the quantization processing.

Further features of the present invention will become apparent from the following description of exemplary embodiments with reference to the attached drawings.

BRIEF DESCRIPTION OF THE DRAWINGS

FIGS. 7A to 7D are diagrams describing time-divisional driving.

FIGS. 8A to 8C are diagrams illustrating position displacement of dots due to index development processing and time-divisional driving.

FIG. 17 is a diagram illustrating dot arrangement patterns in a third embodiment.

FIGS. 18A and 18B are diagrams illustrating the blue noise properties and visual properties (VTF) of human.

DESCRIPTION OF THE EMBODIMENTS

Hereinafter, embodiments according to the present invention are described in detail with reference to the drawings.

First Embodiment

Figure 1:
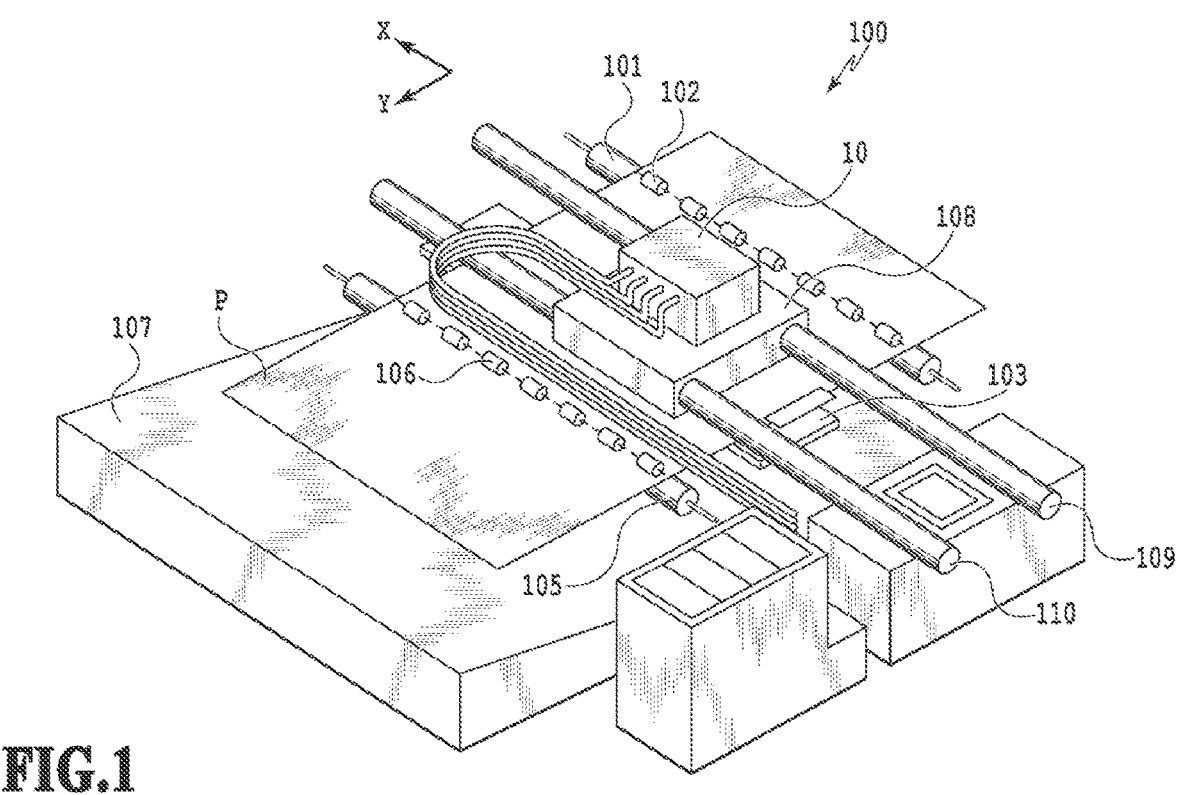
FIG. 1 is a perspective diagram illustrating an overview of a printing part of an ink jet printing apparatus.

FIG. 1 is a perspective diagram illustrating an overview of a printing part of a serial-type ink jet printing apparatus 100 used in this embodiment. A nip portion between a conveyance roller 101 arranged on a conveyance route and pinch rollers 102 associated with the conveyance roller 101 conveys a printing medium P fed to the printing part in a Y direction (sub-scanning direction) along an arrow in FIG. 1 with the rotation of the conveyance roller 101.

A platen 103 is provided at a printing position facing a surface of an ink jet form-printing head 10 in which ejection ports are formed (ejection port surface) and supports a back surface of the printing medium P from below to maintain a constant distance between a front surface of the printing medium P and the ejection port surface of the printing head 10. An area of the printing medium P done with the printing above the platen 103 is nipped by a discharge roller 105 and spurs 106 associated with the discharge roller 105 to be conveyed in the Y direction with the rotation of the discharge roller 105 and is discharged to a discharged sheet tray 107.

The printing head 10 is mounted detachably on a carriage 108 with the ejection port surface facing the platen 103 and the printing medium P. The carriage 108 is moved reciprocally in an X direction along two guide rails 109 and 110 by driving force of a not-illustrated carriage motor, and the printing head 10 executes an ejection operation in response to an ejection signal during the movement.

The X direction in which the carriage 108 is moved relative to the printing medium P is a direction crossing the Y direction in which the printing medium P is conveyed, and the X direction is called a main scanning direction. On the other hand, the Y direction in which the printing medium is conveyed is called a sub-scanning direction. The main scanning of the carriage 108 and the printing head 10 (movement with printing) and the conveyance operation of the printing medium P (sub-scanning) are repeated alternately, and an image is formed by stages on the printing medium P.

Figure 2:
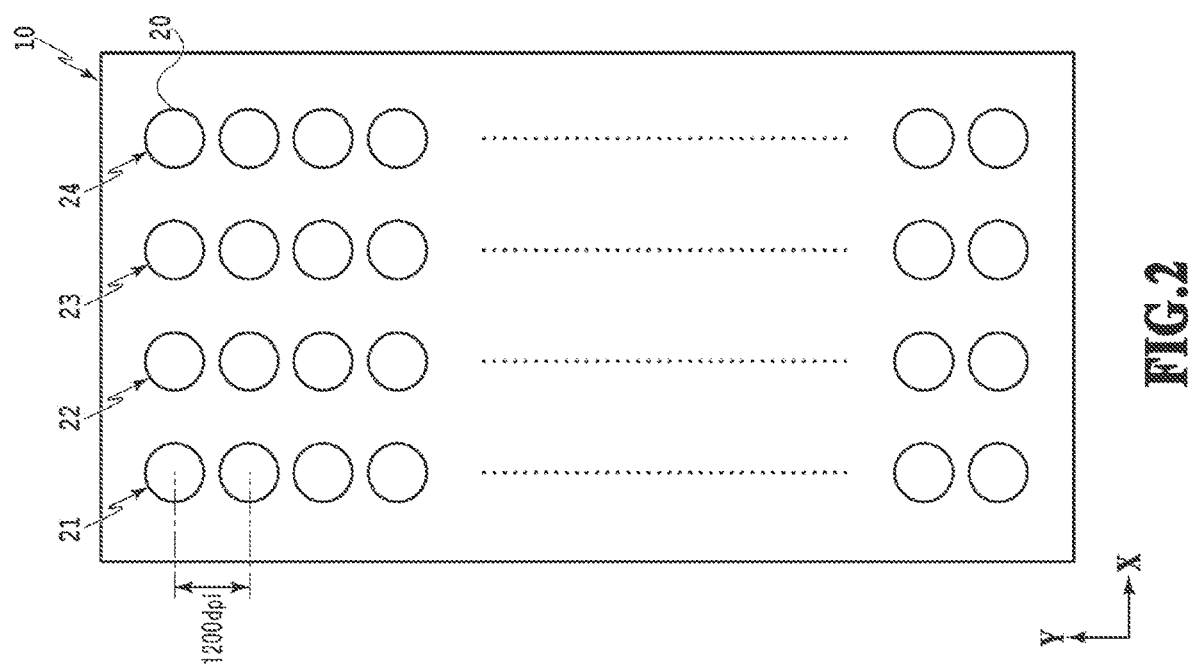
FIG. 2 is a schematic diagram of a case of observing a printing head from an ejection port surface.

FIG. 2 is a schematic diagram of a case of observing the printing head 10 from the ejection port surface. In this embodiment, on the ejection port surface, there are arranged in the X direction a cyan nozzle array 21 that ejects cyan ink, a magenta nozzle array 22 that ejects magenta ink, a yellow nozzle array 23 that ejects yellow ink, and a black nozzle array 24 that ejects black ink. In each of the nozzle arrays, 128 ejection ports 20 that eject ink of the same color are arranged in the Y direction at a pitch of 1200 dpi (dot/inch).

Figure 3:
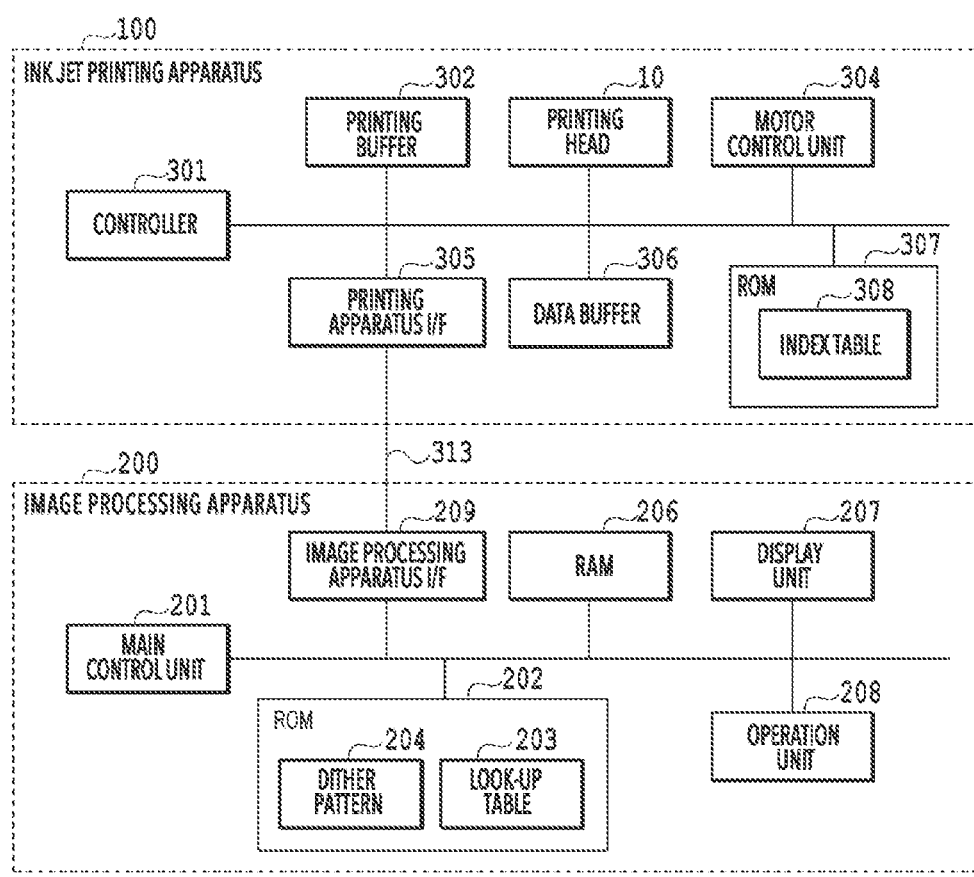
FIG. 3 is a block diagram describing a configuration for controls of an ink jet printing system.

FIG. 3 is a block diagram describing a configuration for controls of an ink jet printing system applicable to this embodiment. The ink jet printing system in this embodiment includes an image processing apparatus 200 and an ink jet printing apparatus (hereinafter, also simply called printing apparatus) 100.

In the ink jet printing apparatus 100, a controller 301 controls the entirety of the printing apparatus. A printing buffer 302 stores print data before being transferred to the printing head 10 as raster data. The printing head 10 has the configuration described in FIG. 2 and ejects the ink from the above-described nozzles according to the print data stored in the printing buffer 302. A motor control unit 304 drives a not-illustrated motor to control the conveyance and the feeding and discharging of the printing medium by rotating the conveyance roller 101 and the discharge roller 105 described in FIG. 1 and to control the movement of the carriage 108.

A printing apparatus interface (I/F) 305 transmits and receives a data signal to and from an image processing apparatus interface (I/F) 209. An I/F signal line 313 connects the printing apparatus interface (I/F) 305 and the image processing apparatus interface (I/F) 209. One having the spec of Centronics interface may be applied as the I/F signal line 313, for example.

A ROM 307 stores not only a program to be executed by the controller 301 but also an index table 308 and the like to be referenced in the printing operation. A data buffer 306 is a work area for the controller 301 to perform the data processing, and image data received from the image processing apparatus 200 is saved in the data buffer 306.

In the image processing apparatus 200, a main control unit 201 controls the entirety of the image processing apparatus 200. A ROM 202 stores not only a program to be executed by the main control unit 201 but also various parameters to be used for the image processing including a variety of look-up tables 203 and dither patterns 204. A RAM 206 is used as a work area for the main control unit 201 to perform the image processing.

The image processing apparatus interface (I/F) 209 transmits and receives the data signal to and from the printing apparatus interface (I/F) 305. A display unit 207 displays various types of information to a user, and an LCD or the like may be applicable, for example. An operation unit 208 is an operation unit that allows the user to operate, and a keyboard or a mouse may be applicable, for example.

Figure 4:
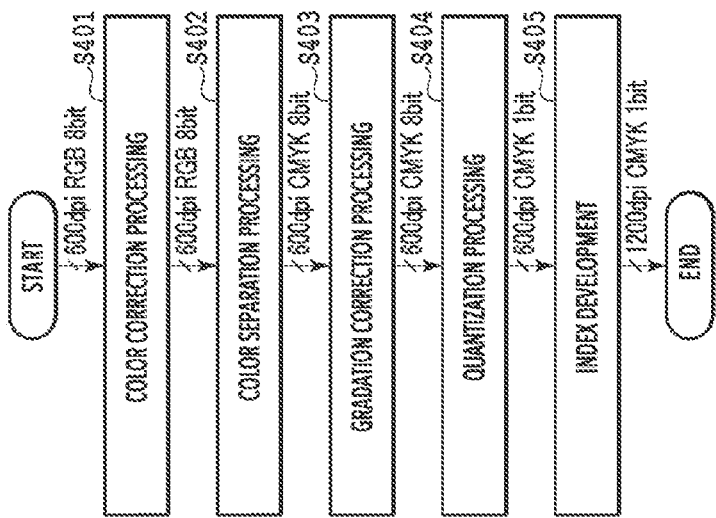
FIG. 4 is a flowchart describing steps of image processing.

FIG. 4 is a flowchart describing steps of the image processing performed by the image processing apparatus 200 and the printing apparatus 100. In this embodiment, S401 to S404 are performed by the main control unit 201 of the image processing apparatus 200, and S405 is performed by the controller 301 of the printing apparatus 100. This processing is started with an input of a printing command by the user through the operation unit 208 for printing of an image generated by an application and the like. The image data as the processing target herein is RGB data of 600 dpi. The RGB data is data in which luminance values of R (red), G (green), and B (blue) expressed by the standardized color space such as sRGB are represented by 8 bits, or levels of 0 to 255.

Once this processing is started, first, in S401, the main control unit 201 performs color correction processing on the image data as the processing target. Specifically, the main control unit 201 refers to a three-dimensional look-up table (LUT 203) stored in the ROM 202 and converts RGB data corresponding to the standardized color space into RGB data corresponding to a color space reproducible by the printing apparatus 100.

In S402, the main control unit 201 performs color separation processing on the RGB data done with the color correction processing. The color separation processing is processing to convert the RGB data representing the luminance values into CMYK data representing density values respectively corresponding to the ink colors used in the printing apparatus. Specifically, the main control unit 201 refers to the three-dimensional look-up table (LUT 203) stored in the ROM 202 and converts the RGB data of 8 bits and 600 dpi to CMYK data of 8 bits and 600 dpi. Thereafter, C data, M data, Y data, and K data are processed individually.

In S403, the main control unit 201 performs gradation correction processing on the CMYK data generated from the color separation processing. In general, the number of dots printed on the printing medium and the optical density implemented on the printing medium by that number of dots are not in the linear relationship. In order to make the relationship linear, the C data, the M data, the Y data, and the K data are corrected. Specifically, the main control unit 201 refers to a one-dimensional look-up table (LUT 203) stored in the ROM 202 for each ink color. Then, the C data, the M data, the Y data, and the K data of 8 bits are converted into C data, M data, Y data, and K data of also 8 bits, respectively.

In S404, the main control unit 201 performs quantization processing on each of the CMYK data done with the gradation correction processing.

Figure 5:
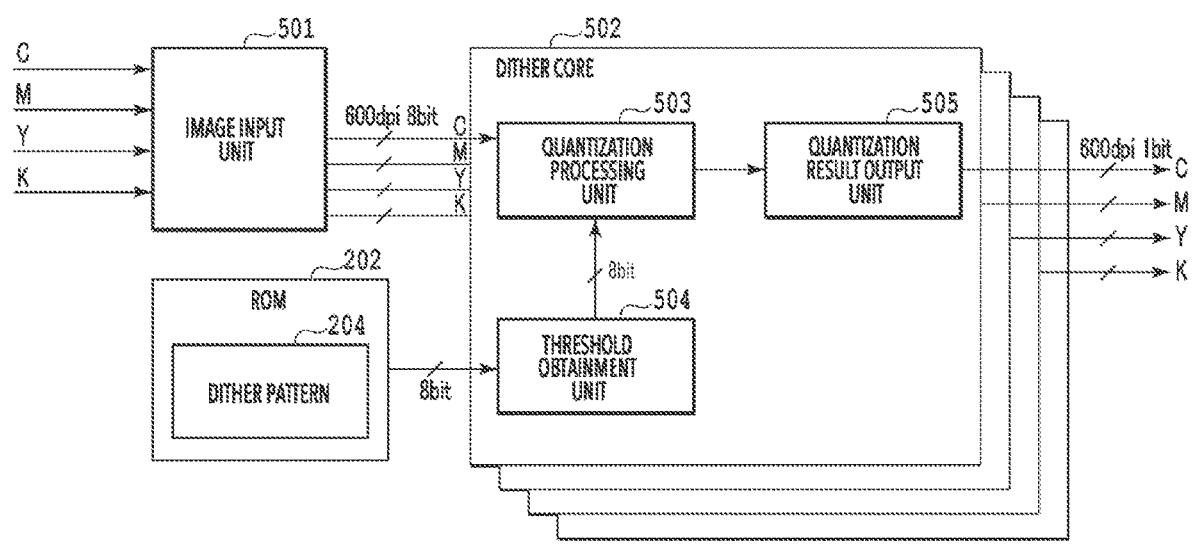
FIG. 5 is a block diagram describing a functional configuration of quantization processing.

FIG. 5 is a block diagram describing a functional configuration of the quantization processing. The blocks illustrated in FIG. 5 are actually functions executed by the main control unit 201 (see FIG. 3). The CMYK data done with the gradation correction processing in S403 is stored once by an image input unit 501. The image input unit 501 provides a dither core 502 of each color with a pixel value (gradation value) of the processing target pixel from the storing CMYK data. In this embodiment, since all the dither cores 502 perform the same processing, a case of cyan is described as an example below. A pixel value of cyan having a value of 0 to 255 is inputted to a quantization processing unit 503. Meanwhile, a threshold obtainment unit 504 selects a threshold corresponding to the pixel position of the processing target pixel from the dither pattern 204 stored in the ROM 202 and provides the quantization processing unit 503 with the threshold. The dither pattern 204 of this embodiment has an area of 16×16 pixels, and a threshold of any one of 0 to 255 is stored in advance for each pixel. The quantization processing unit 503 compares the pixel value provided from the image input unit 501 and the threshold provided from the threshold obtainment unit 504, determines printing (1) or not-printing (0) for the processing target pixel, and outputs the result through a quantization result output unit 505.

With such quantization processing, the CMYK data of 256-gradations and 600 dpi inputted to the image input unit 501 is converted into CMYK data of 2-gradations and 600 dpi, which is then transferred to the printing apparatus 100. Details of the dither pattern 204 are described specifically later.

Back to the description of FIG. 4. In S405, the controller 301 executes index development processing. In the index development processing, the 1-bit data indicating printing (1) or not-printing (0) for each pixel of 600 dpi determined by the quantization processing in S404 is rasterized into 1-bit data indicating printing (1) or not-printing (0) for each pixel of 1200 dpi. Hereinafter, specific descriptions are given.

Figure 6A:
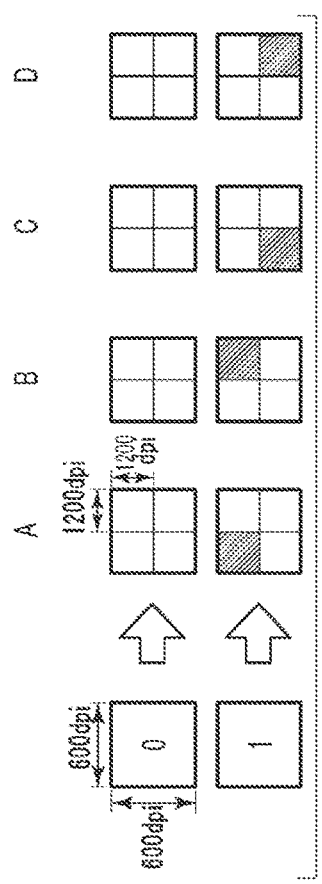
FIGS. 6A and 6B are diagrams illustrating index patterns.

FIG. 6A is a diagram showing a relationship of a pixel value corresponding to a per-pixel area of 600 dpi (left side) and dot arrangement patterns (right side). The area corresponding to one pixel of 600 dpi corresponds to a 2×2-pixel area of 1200 dpi. In FIG. 6A, within the 2×2-pixel area, a shaded pixel represents a pixel in which a dot is printed, and a white pixel represents a pixel in which no dot is printed, respectively.

If the pixel value is 0, no dot is printed in any pixel of the 2×2-pixel area corresponding to the pixel of the pixel value. On the other hand, if the pixel value is 1, a dot is printed in one of the pixels in the 2×2-pixel area corresponding to the pixel of the pixel value. That is, if the pixel value is 1, there are four patterns of printing a dot, which are illustrated as A to D.

Figure 6B:
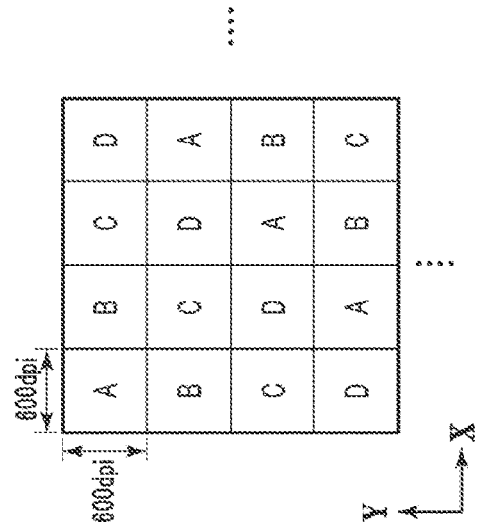

FIG. 6B is a pattern where which of the dot arrangement patterns A to D is used is set by associating with a pixel position (XY coordinate position) of 600 dpi. That is, if the pixel value is 1, the position within the 2×2-pixel area in which a dot is actually printed is changed depending on the pixel position of 600 dpi. Use of the patterns A to D evenly without fixing the dot arrangement pattern as described above makes it possible to equalize the frequency of ejection of the multiple nozzles arranged in the printing head 10. Additionally, it is possible to stabilize refilling of each nozzle after ejection and to inhibit immediate increase of a current. In this embodiment, the index table 308 illustrated in FIG. 3 stores the dot arrangement patterns illustrated in FIG. 6A and the pattern illustrated in FIG. 6B.

The 1-bit data of 600 dpi is converted into the 1-bit data of 1200 dpi by performing the above-described index development processing. With the index development processing S405 prepared in the last of the image processing described in FIG. 4, the image processing apparatus 200 can perform the processing through S401 to S404 with a lower resolution (600 dpi) than the printing resolution (1200 dpi) of the printing apparatus 100. Consequently, it is possible to reduce the processing load and to achieve speed-up of the processing.

The 1-bit data generated from the index development processing is then transferred to the printing buffer 302 (see FIG. 3). The controller 301 drives the printing head 10 according to the print data stored in the printing buffer 302.

FIGS. 7A to 7D are diagrams describing time-divisional driving of the printing head 10 executed by the printing apparatus of this embodiment. FIG. 7A illustrates one of the multiple nozzle arrays 21 to 24 arranged in the printing head 10 described in FIG. 2. The 128 nozzles 20 arranged in the Y direction are divided into 32 sections each including four nozzles and are managed as a first section to a 32nd section in FIG. 7A.

FIG. 7B shows driving timings of the nozzles (printing elements). In FIG. 7B, the horizontal axis represents time, and the vertical axis represents a voltage value of a pulse voltage applied to each nozzle. The printing head 10 performs the ejection operation sequentially on the arranged pixel areas in 1200 dpi while moving in the X direction. In FIG. 7B, time corresponding to the per-pixel area of 1200 dpi is indicated as time T corresponding to one pixel. The time T corresponding to one pixel is a value that is determined based on the moving speed in the X direction of the carriage 108 on which the printing head 10 is mounted.

In this embodiment, the time T corresponding to one pixel is equally divided into four blocks, and time T/4 corresponding to each block corresponds to a per-pixel area of 4800 dpi. Hereinafter, in the time T corresponding to one pixel, a block going ahead is called a first block, and the following three block are called a second block, a third block, and a fourth block, respectively. Additionally, in this embodiment, in each of the sections, a nozzle positioned uppermost in FIG. 7A is driven in the first block, the next nozzle is driven in the second block, the next nozzle is driven in the third block, and the further next nozzle is driven in the fourth block.

Thus, even if the four nozzles in the same section are driven at the same pixel position, the four nozzles each ejects an ink drop 25 every T/4 minutes as illustrated in FIG. 7C. Additionally, since such an ejection operation is performed with the printing head 10 moving in the X direction, dots adjacent in the Y direction are arranged on the printing medium P to be offset by a distance corresponding to a width of one pixel of 4800 dpi, or about 5 μm, in the X direction as illustrated in FIG. 7D.

The above-described time-divisional driving makes it possible to avoid a situation where the adjacent nozzles are driven simultaneously and to stabilize the ejection state of each nozzle. Additionally, it is possible to reduce the upper limit value of a current for driving the many nozzles and to perform the stable driving with a limited power capacity.

However, if the above-described index development processing and time-divisional driving are performed, there may be a case where the graininess of the image is conspicuous even though the quantization processing is performed using the dither pattern 204 having the blue noise properties in S404 of FIG. 4. Hereinafter, specific descriptions are given.

FIGS. 8A to 8C are diagrams describing the position displacement of the dots generated due to the index development processing and the time-divisional driving. FIG. 8A is a diagram illustrating image data of a result of performing the quantization processing in S404 of FIG. 4. Here is described a case where pixel values after the quantization processing (hereinafter, also called quantization values) are uniformly set to 1 (print) in all the pixels included in a 4×4-pixel area of 600 dpi.

FIG. 8B illustrates image data of a result of performing the index development processing in S405 of FIG. 4 on the image data of FIG. 8A. The image data illustrated in FIG. 8A is converted into image data (quantization data) in which printing (1) or not-printing (0) is determined for each pixel of 1200 dpi according to the index patterns illustrated in FIGS. 6A and 6B.

FIG. 8C illustrates dot printing positions on the printing medium in the case of performing the time-divisional driving of this embodiment based on the image data of FIG. 8B. With the time-divisional driving, the per-pixel area of 1200 dpi is divided into four areas having a width of 4800 dpi in the X direction, and a dot can be printed in any one of the four areas. In FIG. 8C, a shaded area represents an area in which a dot is printed, and a white area represents an area in which no dot is printed, respectively.

Figure 9A:
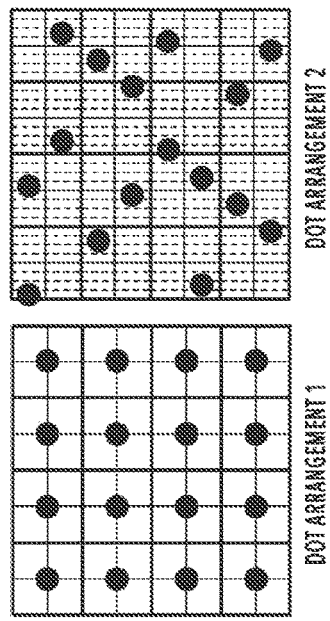
FIGS. 9A and 9B are comparative diagrams of performing and not performing the index development processing and the time-divisional driving.
Figure 9B:
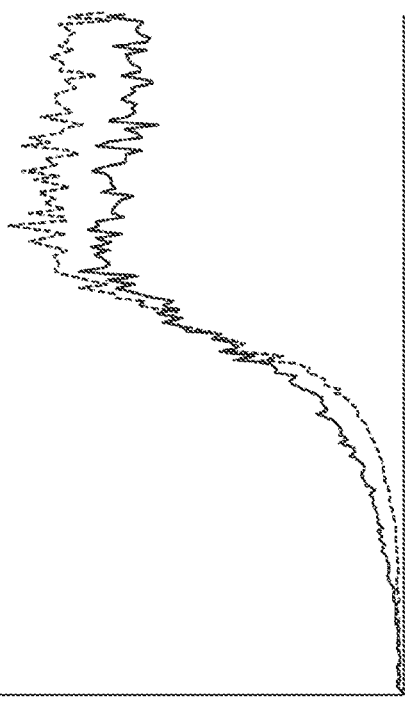

FIGS. 9A and 9B are diagrams comparing a dot arrangement of a case of performing the index development processing and the time-divisional driving of this embodiment with a dot arrangement of a case of not performing the above processing. In FIG. 9A, a dot arrangement 1 represents a dot arrangement of a case where the index development processing and the time-divisional driving of this embodiment are not performed, or a case where the printing is performed directly in 600 dpi based on the result of the quantization processing performed in S404. Dots are each arranged in the center of the per-pixel area of 600 dpi determined as printing (1) in the quantization processing. On the other hand, a dot arrangement 2 is a dot arrangement of a case where the index development processing and the time-divisional driving of this embodiment are performed. Dots are each arranged in the divided area that is shaded in FIG. 8C. In the comparison of those two diagrams, it can be seen that the dot dispersion state of the dot arrangement 2 in which the index development processing and the time-divisional driving of this embodiment are performed is more uneven than that of the dot arrangement 1 in which the index development processing and the time-divisional driving of this embodiment are not performed.

Although the dot size is illustrated small in FIG. 9A for the sake of easy understanding of the dot dispersion state, the dot actually printed on the printing medium is designed to be sufficiently larger than the per-pixel area of 600 dpi. Thus, in the case where the pixel values of all the pixels are 1 (printing rate is 100%) like FIG. 8A, adjacent dots are overlapped with each other, and the printing medium are filled with the dots. Because of this, the difference of the dot dispersibility illustrated like FIG. 9A is not actually recognized. However, in a case of the printing rate at which the dots are not overlapped with each other (50% or less), the unevenness of the dot dispersion state is likely to be recognized visually.

FIG. 9B shows frequency properties of the dot arrangements respectively obtained in the cases of performing and not performing the index development processing and the time-divisional driving of this embodiment. In FIG. 9B, the solid line represents the frequency properties of the case of performing the index development processing and the time-divisional driving, and the broken line represents the frequency properties of the case of not performing the index development processing and the time-divisional driving. The broken line has the characteristics of the blue noise described in FIG. 18A that are reduced low frequency components, sharp rising, and flat high frequency components. On the other hand, those characteristics of the solid line are slightly inadequate. Specifically, comparing with the broken line, a power of the low frequency components is increased, and the rising is gradual. Consequently, the graininess of the low frequency area that is highly sensed in the visual properties (VTF) of human shown in FIG. 18B is conspicuous, and this gives an impression that the image is lack of uniformity.

That is, although the quantization processing is performed using the dither pattern having the blue noise properties, if the index development processing and the time-divisional driving are performed, the dot dispersibility of the dither pattern may be reduced, and the graininess of the image may be conspicuous.

In light of the above-described situation, the inventors determined that it is effective to form the dither pattern used in the quantization processing under the assumption that the dot arrangement is changed from the dot arrangement 1 to the dot arrangement 2 as illustrated in FIG. 9A in the case of performing the index development processing and the time-divisional driving. Specifically, a pixel area for the sake of convenience of 4800 dpi in the X direction×1200 dpi in the Y direction like the dot arrangement 2 is prepared, and a pixel in which a dot can be arranged under the index development processing and the time-divisional driving is set in advance as a dot-arrangeable-pixel. In this embodiment, such a dot-arrangeable-pixel is the shaded pixel in FIG. 8C. Then, assuming that the pixel values of the pixels arranged at 600 dpi are the same values, thresholds are set to be associated with the above pixel areas respectively to obtain high dispersibility regardless of the pixel values.

Figure 10:
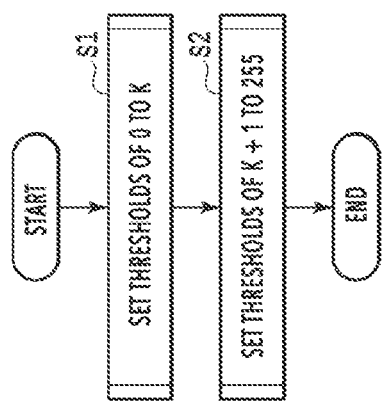
FIG. 10 is a flowchart describing dither pattern generation procedures.

FIG. 10 is a flowchart describing generation procedures of the dither pattern of this embodiment. As described above, the dither pattern of this embodiment corresponds to a unit area of 256 pixels of 16×16 pixels corresponding to 600 dpi. In the dither pattern generation procedures of FIG. 10, a threshold of any one of 0 to 255 is set for each pixel area included in the dither pattern.

Once this processing is started, first, in S1, low level thresholds (0 to K) out of the thresholds of 0 to 255 are set for the 256 pixel areas included in the dither pattern. Then, in S2, the remaining middle to high level thresholds (K+1 to 255) are set. Thus, in this embodiment, the thresholds 0 to 255 are set for the dither pattern through the two steps S1 and S2.

Figure 11:
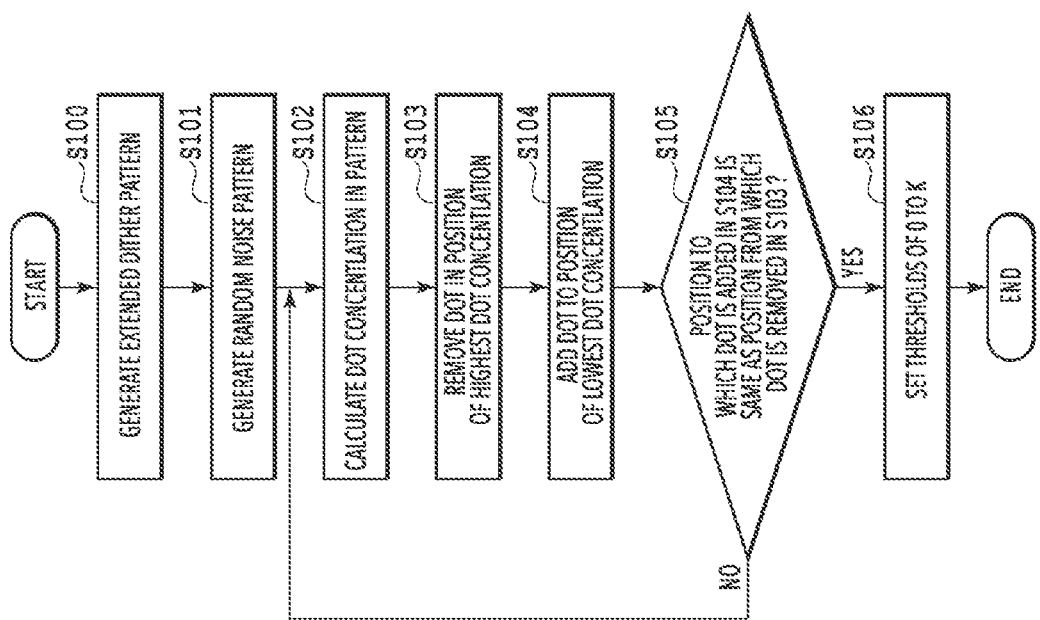
FIG. 11 is a flowchart describing steps of setting a low level threshold.

FIG. 11 is a flowchart describing the step of setting the low level thresholds (0 to K) in S1. Once this processing is started, first, in S100, an extended pattern is generated. Specifically, a pixel area of the dither pattern 204 of 600× 600-dpi is divided into pixel areas of 4800 dpi in the X direction×1200 dpi in the Y direction (extended in data). That is, the one pixel at 600×600 dpi is divided into divided pixels, which are 16 pixels including eight pixels in the X direction and two pixels in the Y direction. In this way, a pseudo pixel area in which a pixel area having a size of 5 μm in the X direction and 21 μm in the Y direction is arranged 128 pieces in the X direction and 32 pieces in the Y direction is generated. Then, among the 16 divided pixels corresponding to the one pixel before division, a divided pixel in which a dot can be arranged under the index development processing and the time-divisional driving is set as the dot-arrangeable-pixel. This pattern of 4800 dpi×1200 dpi is the extended pattern.

The pixel in which a dot can be arranged in the index development processing can be obtained based on the index pattern illustrated in FIGS. 6A and 6B and determined in advance. The pixel in which a dot can be arranged in the time-divisional driving can be obtained based on the number of the blocks in the block driving and the order of driving in each section described in FIGS. 7A and 7B. In this embodiment, the number of the dot-arrangeable-pixels included in the extended pattern is 256. Consequently, FIG. 8C corresponds to a part of the extended pattern (4×4-pixel area of 600 dpi), and the shaded divided pixel is the dot-arrangeable-pixel in which a dot can be arranged. On the other hand, the white divided pixel is a pixel in which no dot is arranged in the control of the above-described block driving.

Back to the description of FIG. 11. In S101, a random noise pattern is formed. Specifically, K pixels (K≤256) out of the 256 dot-arrangeable-pixels included in the extended pattern of 4800×1200 dpi prepared in S1 are selected randomly, and a dot is arranged in the selected pixel position.

In S102, the dot concentration of each pixel of the current dot arrangement in the extended pattern is calculated. Although how to calculate the dot concentration is not particularly limited in this embodiment, it should be noted that the dot concentration is a value as an evaluation value for evaluating the dot dispersibility around each pixel. For example, a pixel value of each pixel obtained by providing the pixel in which a dot is arranged with a certain pixel value and filtering a gauss filter of a predetermined size can be calculated as the dot concentration. Otherwise, the dot concentration can be calculated by using a low-pass filter (LPF), an inter-dot distance, or the like. If the dot concentration is high, it means that the dot dispersibility around the pixel is low, and if the dot concentration is low, it means that the dot dispersibility around the pixel is high. In this case, it is favorable to obtain the dot concentration while arranging extended patterns having the same dot arrangement in eight directions around the extended pattern as the processing target and reproducing the state of the printing medium on which the same dither pattern is used repeatedly. In any case, for the individual pixels, it is sufficient that at least a value indicating the degree of concentration of dots in the surrounding area of each pixel is obtained as the dot concentration.

In S103, a pixel having the highest dot concentration is selected from all the dot-arrangeable-pixels, and the dot arranged in this pixel is removed. In the following S104, a pixel having the lowest dot concentration is selected from all the dot-arrangeable-pixels, and a dot is added to this pixel.

In S105, it is determined whether the pixel from which the dot is removed in S103 is the same as the pixel to which the dot is added in S104. If it is No, it is determined that the dispersibility of the current dot arrangement in the extended pattern is insufficient yet, and the process returns to S102. On the other hand, if it is determined as Yes in S105, it is possible to assume that sufficient dispersibility of the dot arrangement is obtained in the extended pattern, and the process proceeds to S106. As described above, repeating of the steps of S102 to S104 until it is determined as Yes in S105 improves the dot dispersibility in the extended pattern gradually.

In S106, the thresholds of 0 to K are set in the descending order from a pixel of higher dot concentration (evaluation value) among the pixels in which dots are arranged in the extended pattern. Specifically, first, a pixel of the highest dot concentration in the extended pattern is selected, and a threshold of the dither pattern corresponding to the pixels of 600×600 dpi including the pixel of the highest dot concentration is set to K. Next, in the extended pattern, the dot of the pixel in which the threshold is set to K is removed, and the dot concentration of each pixel is recalculated. Then, a pixel of the highest dot concentration in the recalculated result is selected, and a threshold of the dither pattern corresponding to the pixels of 600×600 dpi including the pixel of the highest dot concentration is set to (K−1). Thereafter, in this order, the thresholds of the dither pattern are set in the descending order while associating with the dot concentration, and at last, a threshold of the dither pattern corresponding to a pixel of the lowest dot concentration is set to 0. This processing is then terminated.

Referring back to FIG. 10 again. Once the thresholds of 0 to K are set in the dither pattern of 16×16 in S1, the remaining thresholds of (K+1) to 255 are set in S2. Specifically, first, the extended pattern generated in S1, or the extended pattern in which the K dots are arranged with high dispersibility, is prepared again. Then, a pixel of the lowest dot concentration is selected from the dot-arrangeable-pixels in which no dots are arranged, and a threshold of the dither pattern corresponding to the pixels of 600×600 dpi including the pixel of the lowest dot concentration is set to (K+1). Next, a pixel of the second lowest dot concentration is selected from the dot-arrangeable-pixels in which no dots are arranged, and a threshold of the dither pattern corresponding to the pixels of 600×600 dpi including the pixel of the second lowest dot concentration is set to (K+2). Thereafter, in this order, the thresholds are set in the ascending order while associating with the dot concentration, and at last, a threshold corresponding to a pixel of the highest dot concentration is set to 255.

As described above, all the thresholds are set one by one in the dither pattern of 16×16, and this processing is terminated. That is, the dither pattern of 16×16 in this embodiment is completed.

The dither pattern formed by the above-described method can be stored in the ROM 202 as the dither pattern 204 illustrated in FIG. 3. Then, if a printing command is actually generated, the main control unit 201 of the image processing apparatus 200 performs the quantization processing with reference to this dither pattern. The controller 301 of the printing apparatus 100 prints an image by performing the index development processing described in FIGS. 6A and 6B and the time-divisional driving described in FIG. 7 according to the binary data generated by the main control unit 201. In this process, the dots printed on the printing medium have a dot pattern with the reproduced high dispersibility generated under the extended pattern of 1200× 4800 dpi. That is, with the dither pattern formed by the method of this embodiment, it is possible to output an image with excellent dot dispersibility and reduced graininess even if the positions of the dots determined in the quantization processing are moved during the controls of the printing apparatus.

Additionally, the dither pattern formed by the method of this embodiment makes it possible to output an image with high dispersibility by cooperating with the predetermined controls performed after the quantization processing such as the index development processing and the time-divisional driving. Thus, if the dither pattern formed by the method of this embodiment is used but the index development processing and the time-divisional driving are not performed after the quantization processing, the dispersibility is consequently lower than in the case of performing the index development processing and the time-divisional driving.

In the above example, in FIG. 10, the K dots out of the total of 255 dots are arranged precedingly with high dispersibility to set the thresholds (S1). In this process, it is favorable to set the value of K to a gradation value (natural number equal to or greater than 2) out of 0 to 255 that makes the granularity most conspicuous on the printing medium. This makes it possible to set the dot pattern of the gradation value with the most conspicuous granularity in advance so as to obtain high dispersibility by repeating S102 to S105 of FIG. 11, and thus it is possible to inhibit the graininess in all the gradation areas. Since the gradation value of the most conspicuous granularity may be different depending on the ink colors, the value of K may be adjusted for each color, and different dither patterns may be generated depending on the colors.

It should be noted that the value of K is not necessarily limited to the above-described value. For example, K=255 may be applicable. In this case, only S106 of FIG. 11 is executed with the dots arranged in all the (256) dot-arrangeable-pixels. That is, the thresholds of 0 to K are set in the descending order from the pixel of higher dot concentration with the dots arranged in all the dot-arrangeable-pixels. Even in this case, since the thresholds are set based on the dot concentration under the expanded pattern of 1200×4800 dpi, it is possible to reduce the graininess more than conventional cases.

Second Embodiment

The printing apparatus and the image processing apparatus described in FIGS. 1 to 3 are used to perform the image processing according to the flowchart of FIG. 4 also in this embodiment. It should be noted that, in this embodiment, the gradation values of 0 to 255 are quantized (gradation reduction) not to two values of 0 and 1 but to three or more values.

Figure 12:
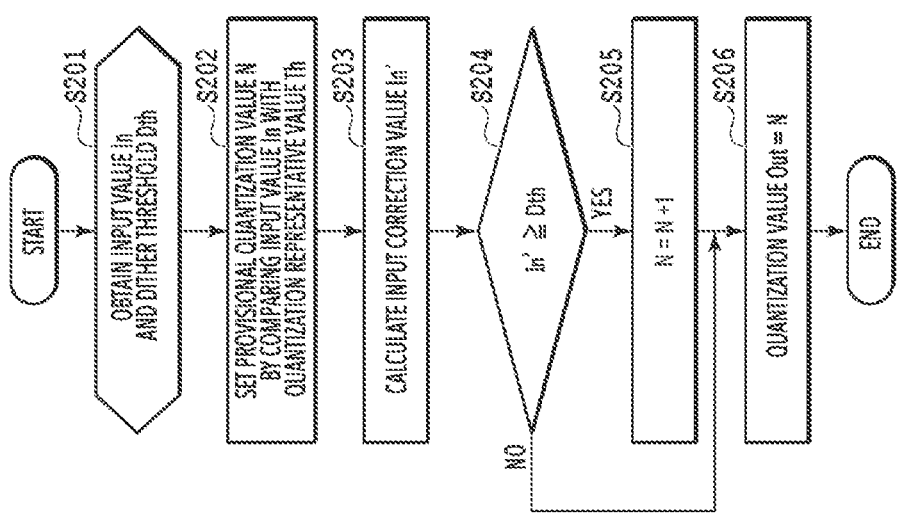
FIG. 12 is a flowchart describing quantization processing in a second embodiment.

FIG. 12 is a flowchart describing the quantization processing executed in S404 of FIG. 4 by the main control unit 201 of the image processing apparatus 200 in this embodiment. This processing is performed by the main control unit 201 sequentially on each pixel of 600 dpi of the CMYK data in which each color is 8 bits.

Once this processing is started, first, in S201, the main control unit 201 obtains an input value In as the pixel value of the processing target pixel and obtains a threshold Dth corresponding to the pixel position of the processing target pixel from the dither pattern 204.

In S202, the main control unit 201 compares the input value of the processing target pixel with a predetermined quantization representative value Th and sets a provisional quantization value N corresponding to the processing target pixel. In this embodiment, the quantization representative value Th represents a boundary value for dividing a gradation area of the input value In into areas corresponding to the number of the gradation of the quantization value.

Hereinafter, descriptions are given with an example where the gradation values of 0 to 255 are quantized to three values. In this case, for example, a median (Th=128) is set as the quantization representative value Th, and the provisional quantization value N can be set according to the following expressions:

where In<Th, N=0; and where In ≥Th, N=1.

For example, if the input value In is quantized to four values, two quantization representative values Th1 and Th2 (>Th1) may be prepared, and the provisional quantization value N may be set according to the following expressions:

where In<Th1, N=0;

where Th1≤In<Th2, N=1; and where Th2≤In, N=2.

In S203, the main control unit 201 calculates an input correction value In' according to the following expressions:

where N=0, In'=In; and where N=1, In'=In −Th.

In S204, the input correction value In' obtained in S203 is compared with the threshold Dth obtained in S201. In this example where the gradation values of 0 to 255 are quantized to three values, the 16×16-pixel area constituting the dither pattern store pairs of the same thresholds of 0 to 127. That is, in the above-described S201, any one of the values of 0 to 127 is obtained as the threshold Dth of the processing target pixel. Then, if In'≥Dth, 1 is added to the provisional quantization value N in S205, and the process proceeds to S206. On the other hand, if In'<Dth in S204, the process proceeds to S206 while maintaining the current provisional quantization value N.

In S206, the current provisional quantization value N is determined as a quantization value Out of the processing target pixel, and the quantization value Out is outputted. Then, this processing is terminated.

Figures 13A, 13B:
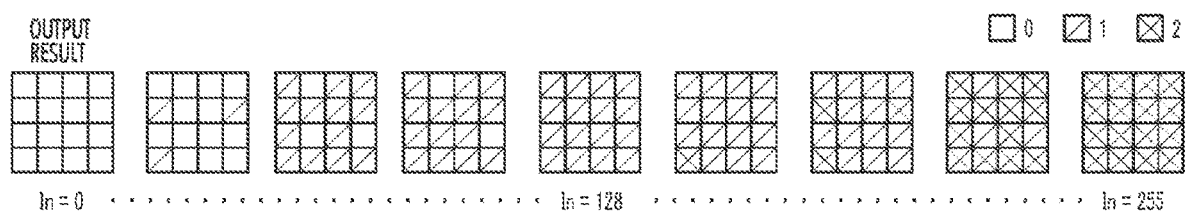
FIGS. 13A and 13B are diagrams illustrating examples of a dither pattern and output results in a case of quantization into three values.

FIGS. 13A and 13B are diagrams illustrating a dither pattern and examples of results of the case of quantizing the gradation values of 0 to 255 to three values (0 to 2). For the sake of simple description, here is described a case of a dither pattern corresponding to a 4×4-pixel area and a quantization result Out of input of the same pixel values to this 4×4-pixel area, with the input value In being various values of 0 to 255.

If the input value is In=0, the quantization values of all the pixels included in the 4×4-pixel area are Out=0. If the input value In is 0<In<128, there are both a pixel in which the quantization value is Out=0 and a pixel in which the quantization value is Out=1. As the value of the input value In is increased, the number of the pixels in which Out=1 is increased, and if In=128, the quantization values of all the pixels are Out=1.

If the input value In is 128<In<255, there are both a pixel in which the quantization value is Out=1 and a pixel in which the quantization value is Out=2. As the value of the input value In is increased, the number of the pixels in which Out=2 is increased, and if In=255, the quantization values of all the pixels are Out=2. Thus, in the quantization processing described herein, the multi-value input value In is converted into any one of the quantization values of 0 to 2 as illustrated in FIG. 13B based on the single dither pattern illustrated in FIG. 13A.

In the index development processing after performing the multi-value quantization processing, a dot arrangement pattern corresponding to the quantization values is prepared. That is, even in the same pixel position, the dot arrangement pattern used if the quantization value is 1 and the dot arrangement pattern used if the quantization value is 2 are different from each other. Thus, even if a dispersibility favorable for the gradation area in which the input values are In=0 to 127 is obtained by the method of the first embodiment, a favorable dispersibility is not necessarily be obtained in the gradation area in which the input values are In=128 to 255 by using the same dither pattern. Hereinafter, specific descriptions are given.

Figure 14:
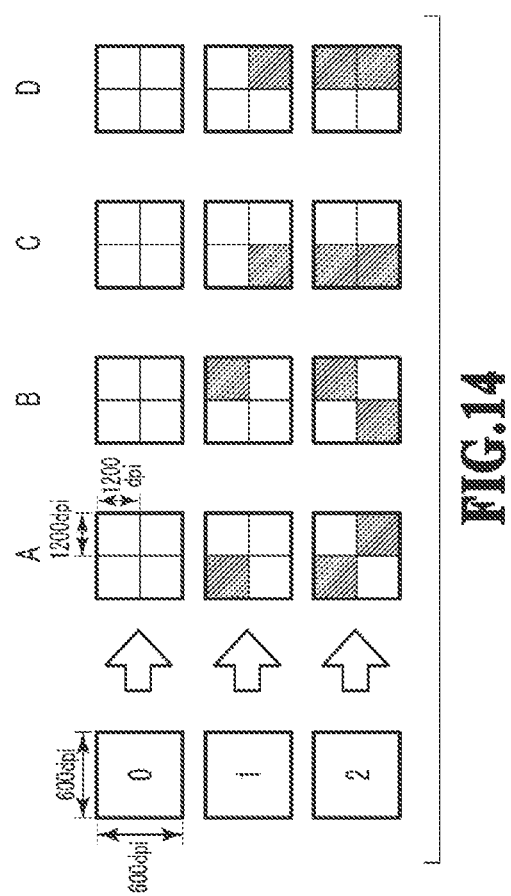
FIG. 14 is a diagram illustrating dot arrangement patterns in the second embodiment.

FIG. 14 is a diagram illustrating dot arrangement patterns used in the index development processing (S405 of FIG. 4) of this embodiment. As with FIG. 6A described in the first embodiment, in the 2×2-pixel area, the shaded pixel represents a pixel in which a dot is printed, and the white pixel represents a pixel in which no dot is printed, respectively. In this embodiment, in addition to the cases where the quantization value is 0 and the quantization value is 1, a dot arrangement pattern for a case where the quantization value is 2 is also prepared.

If the quantization value is 2, dots are printed in any two pixels of the corresponding 2×2-pixel area. In this embodiment, in each of the dot arrangement patterns A to D, a position in which a dot is printed is determined such that the pixel in which a dot is printed in the case where the quantization value is 1 allows also a dot in the case where the quantization value is 2 to be printed therein. Additionally, as with the first embodiment, the dot arrangement pattern is arranged according to the pattern illustrated in FIG. 6B. That is, on the printing medium, a new dot is added to an already existed dot pattern as the gradation value is increased.

On the other hand, also in this embodiment, the dots are printed by performing the time-divisional driving similar to that of the first embodiment after performing the above-described index development processing. In this process, in the 2×2-pixel area of the dot arrangement pattern determined in the index development processing, a block for the dot printed if the quantization value is 1 (driving timing) and a block for the dot printed if the quantization value is 2 are different from each other.

That is, in this embodiment, the dispersibility of the case where the quantization value is 1 and the dispersibility of the case where the quantization value is 2 are affected by the effects from the different dot arrangement patterns and the effects from the different driving blocks. For this reason, in this embodiment, there are prepared a first dither pattern for the case where the input value In is any one of 0 to 127 (provisional quantization value N is 0) and a second dither pattern for the case where the input value In is any one of 128 to 255 (provisional quantization value N is 1), individually.

Figure 15:
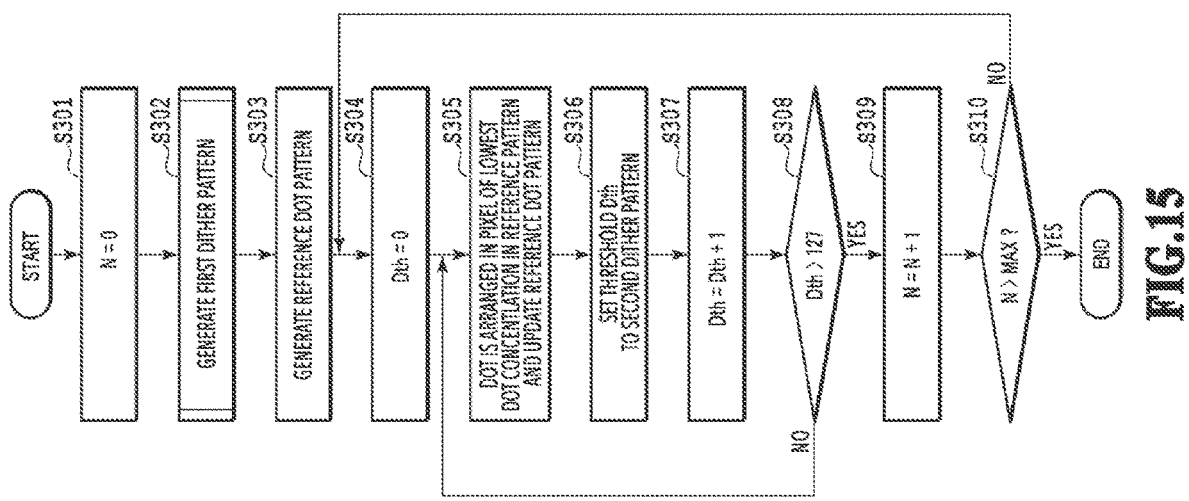
FIG. 15 is a flowchart illustrating steps of generating a dither pattern in the second embodiment.

FIG. 15 is a flowchart describing procedures of forming the dither pattern in this embodiment. In this embodiment, two types of dither patterns in which a threshold of any one of 0 to 127 is set to be associated with each pixel position of the 16×16 pixels are prepared. That is, there are prepared the first dither pattern for the case where the input value In is any one of 0 to 127 (provisional quantization value N is 0) and the second dither pattern for the case where the input value In is any one of 128 to 255 (provisional quantization value N is 1).

Once this processing is started, first, in S301, the provisional quantization value N is set to 0. Next, in S302, the first dither pattern used for the case where the provisional quantization value N is 0 is generated. Basically, the first dither pattern can be formed according to the flowcharts of FIGS. 10 and 11 described in the first embodiment. However, the range of the thresholds to be stored is not the gradation range (0 to 255) of the input value In but the half thereof (0 to 127). Thus, in S106 of FIG. 11, the pairs of the same thresholds of K to 0 are set in two pixels in the descending order sequentially from a pixel of higher dot concentration out of the pixels in which the dots are arranged in the extended pattern. In S2 of FIG. 10, the pairs of the same thresholds of (K+1) to 127 are set in two pixels in the ascending order sequentially from a pixel of lower dot concentration out of the dot-arrangeable-pixels in which no dots are arranged. With those steps, the first dither pattern having the 16×16-pixel area in which the pairs of the same thresholds of 0 to 127 are set is generated.

In S303, based on the first dither pattern formed in S302, a reference dot pattern in the case where the input value In is the maximum value of the threshold (In=127) is generated. Specifically, as with the first embodiment, an extended pattern including the divided pixels of 4800 dpi×1200 dpi of higher resolution than the quantization resolution is prepared. Then, dots are arranged in all the divided pixels in which dots can be arranged under the dot arrangement pattern and the time-divisional driving of the case where the quantization value is 1. In this process, as with the first embodiment, a dot is arranged in one pixel as the dot-arrangeable-pixel out of the 16 divided pixels corresponding to the one pixel of 600 dpi×600 dpi. Next, a divided pixel in which a dot can be arranged under the dot arrangement pattern and the time-divisional driving of the case where the quantization value is 2 is selected. In this process, one pixel of the 15 remaining divided pixels in which no dots are arranged out of the 16 divided pixels corresponding to the one pixel of 600 dpi×600 dpi is set as the dot-arrangeable-pixel.

Figure 16:
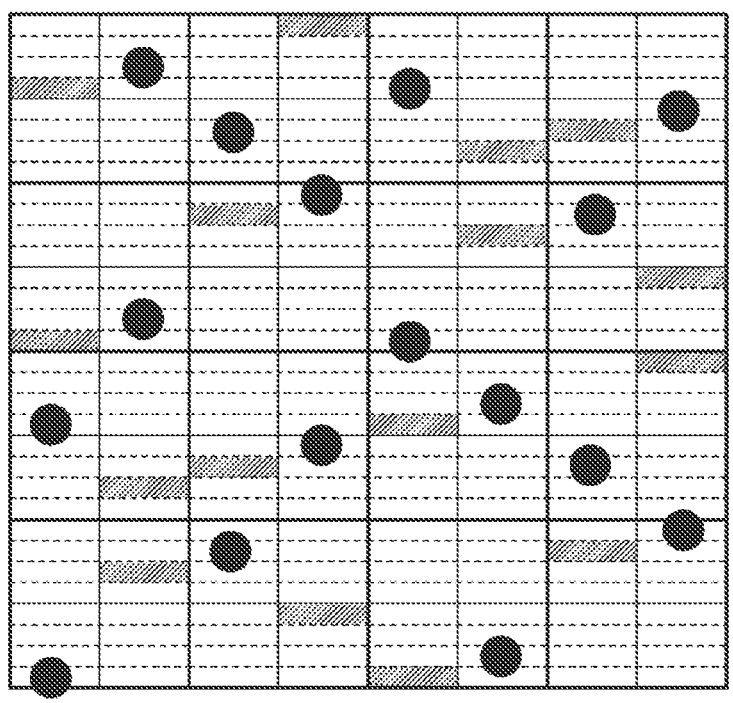
FIG. 16 is a diagram illustrating an example of a reference dot pattern.

FIG. 16 is a diagram illustrating an example of the reference dot pattern generated in S303. In FIG. 16, a black circle is a dot already arranged and represents a pixel in which the dot is printed if the quantization value is 1. A shaded pixel represents a dot-arrangeable-pixel in which a dot can be arranged further if the quantization value is 2.

Referring back to the flowchart of FIG. 15. In S304, the threshold Dth is set to Dth=0. In S305, the dot concentration of each pixel in the current reference pattern is calculated, and dots are arranged in two dot-arrangeable-pixels of the lowest dot concentration to update the reference dot pattern. Since the calculation method of the dot concentration is similar to that of the first embodiment, the description thereof is omitted herein.

In S306, the threshold of the second dither pattern corresponding to the pixel of 600×600 dpi including the pixel of 4800×1200 dpi to which the dot is added in S305 is set to Dth. With this, the thresholds Dth of the same values are set to two pixels of the 16×16 pixels constituting the second dither pattern.

In S307, 1 is added to the threshold Dth. In S308, it is determined whether the current threshold Dth exceeds the maximum value (127). If it is No, the process returns to S305 to set a new threshold to the second dither pattern. Then, S305 to S308 are repeated until Dth>127 is obtained. With this, in the second dither pattern, the thresholds Dth are set in the ascending order with the dot concentration and the threshold associated with each other such that new dots are arranged in the order from a pixel of lower dot concentration. On the other hand, if it is Yes in S308, it means that all the thresholds are set in the second dither pattern. Thus, the process proceeds to S309, 1 is added to the provisional quantization value N, and it is determined whether N exceeds the maximum value MAX of the provisional quantization value in S309.

For example, if the quantization to the three values of 0 to 2 is performed like this example, the maximum value of the provisional quantization value is MAX=1. Thus, there is obtained N>MAX once the second dither pattern is generated, and this processing is terminated.

On the other hand, if the quantization to four values is performed, the process returns to S304 again to form a dither pattern (third dither pattern) for the next provisional quantization value. Then, thresholds of the dither pattern corresponding to the next gradation area continuous from the current gradation area are set sequentially from Dth=0 again. In this process, even if the provisional quantization value N is updated, the reference dot pattern updated until then is maintained. Then, also in S305 performed thereafter, the dot concentration is calculated based on the above-described reference dot pattern.

According to the above-described dither pattern generation method, it is possible to prepare a dither pattern with which a high dispersibility is obtained in each gradation area (provisional quantization value N) while associating with the provisional quantization value N. Additionally, with the quantization processing performed according to the flowchart described in FIG. 12 using such a dither pattern, it is possible to output stably a uniform and smooth image with reduced graininess regardless of the image density. That is, it is possible to output an image having a high dispersibility by the cooperation of the dither pattern formed by the method of this embodiment and the predetermined controls performed after the quantization processing such as the index development processing and the time-divisional driving.

In this embodiment, there is described the mode of comparing the input correction value In' obtained by subtracting the quantization representative value from the input value In with the thresholds of 0 to 127 stored in the corresponding dither pattern. However, for example, the thresholds of 0 to 127 may be set to the first dither pattern, and the thresholds of 128 to 255 may be set to the second dither pattern. In this case, a dither matrix used based on the input value In may be selected, and the input value In may be compared with a threshold of the selected dither matrix.

Third Embodiment

Also in this embodiment, the printing apparatus and the image processing apparatus described in FIGS. 1 to 3 are used to perform the image processing according to the flowchart of FIG. 4. Also in this embodiment, as with the second embodiment, the gradation values of 0 to 255 are quantized to three values. However, it should be noted that, in this embodiment, a small dot is printed in the pixel in which the quantization value is 1, and a large dot is printed in the pixel in which the quantization value is 2.

FIG. 17 is a diagram illustrating dot arrangement patterns used for the index development processing (S405 of FIG. 4) of this embodiment. As with the above-described embodiment, within the 2×2-pixel area, a pixel in which the small dot is printed and a pixel in which the large dot is printed are determined associating with the corresponding quantization values. In the dot arrangement patterns A to D, the pixel in which the small dot is printed if the quantization value is 1 and the pixel in which the large dot is printed if the quantization value is 2 are different from each other.

That is, in this embodiment, the gradation area (In=128 to 255) to which the large dots are added is not in the state like the second embodiment, or the state where new dots are added to the already existing dot pattern as the gradation value is increased. In this embodiment, the small dot is removed from the already existing dot pattern, and the large dot is added to a position different from that of the small dot.

Thus, in this embodiment, although the dither pattern is formed for every provisional quantization value N as with the second embodiment, the reference dot pattern updated with the previous provisional quantization value (N−1) like the second embodiment is not used to form the dither pattern of the provisional quantization value N. More specifically, for both the small dot and large dot, based on the index patterns illustrated in FIGS. 17 and 6B and the time-divisional driving illustrated in FIG. 7, the dither patterns are individually formed according to the flowchart same as that of the first embodiment illustrated in FIGS. 10 and 11.

Then, with the quantization processing performed according to the flowchart described in FIG. 12 using such dither patterns, it is possible to output stably a uniform and smooth image with reduced graininess regardless of the image density.

Other Embodiments

Even in the case of using the large dot and the small dot like the third embodiment, it is also possible to add the large dot without removing the small dot arranged at level 1 and to make this state as the dot arrangement pattern at level 2. In this case, since new dots are added to the already existing dot pattern even in the gradation to which the large dots are added, it is favorable to form the first and second dither patterns by the similar method as that of the second embodiment. Additionally, in this case, if the dot concentration is obtained using the extended pattern, it is possible to enhance the dot dispersibility more effectively by providing a larger pixel value to the pixel in which the large dot is arranged than that of the pixel in which the small dot is arranged. Moreover, although there is described the case of using the large dots and the small dots as an example in the third embodiment, it is also possible to replace with a case of using dense ink with a high dye density and pale ink with a low dye density.

In the second and third embodiments, as an example, there is described as an example the case where the input values of 0 to 255 are quantized to the three values of 0 to 2 with the quantization representative value Th set to the median Th=128. However, the quantization representative value Th may not be necessarily the value dividing the gradation range equally. If the quantization representative value Th is not the value dividing the gradation range equally, the range of the thresholds set for each dither pattern and the number of the pixels (L pixels) constituting the dither pattern may be adjusted according to the size of the gradation area. Specifically, for example, if the quantization representative value Th is Th=150 in the second embodiment, thresholds of 0 to 149 may be set to the first dither pattern, and thresholds of 0 to 106 may be set to the second dither pattern. Additionally, the input correction value In' may be normalized to the reference range (0 to 128) to match the size of the gradation area with the size of the reference (0 to 128).

Although the dot arrangement pattern having the 2×2-pixel area is described in the above-described embodiment, the size of the dot arrangement pattern is not limited thereto. For example, if the printing is performed with the printing resolution of 2400×2400 dpi with respect to the input resolution of 600 dpi, a dot arrangement pattern having the 4×4-pixel area may be prepared. In this case, in the quantization processing, the input value In may be quantized to 17 values that can be expressed in the 4×4-pixel area. It is needless to say that, in this case, for the types of the dot arrangement patterns, it is possible to more types of patterns, not only the four types. Also, for the arrangement order of the dot arrangement patterns, it is not limited to the pattern illustrated in FIG. 6B. The dot arrangement patterns A to D may be arranged in the order different from that in FIG. 6B, and the arrangement may be defined by a further larger cycle (pattern). The pattern illustrated in FIG. 6B may be used repeatedly by offsetting the starting position.

Although the four-division driving in which the driving is performed on one pixel divided into four blocks is described as an example, the present invention is not limited thereto. The individual nozzles may not be driven in the order of the arrangement as illustrated in FIG. 7. For example, in the individual sections illustrated in FIG. 7, the blocks may be driven in the order from the first, the third, the second, to the fourth. Since the displacement of the dots between the blocks occurs as long as at least multiple nozzles are divided into multiple sections and the division driving of two or more blocks is performed, it is possible to exert the effects of the present invention.

Additionally, if the printing apparatus performs the two direction printing in which the forward scanning and the backward scanning of the printing head 10 are alternately performed to print an image, the direction in which a dot is shifted is inverted between the forward scanning and the backward scanning even with the same time-divisional driving. That is, if the printing head 10 is moved in a +X direction, a dot driven later is arranged to be displaced on the +X direction side of a dot of a nozzle driven precedingly, but the relationship is inverted if the printing head 10 is moved in a −X direction. That is, between the forward scanning and the backward scanning, the positions of the dot-arrangeable-pixels in the extended pattern (X coordinate) are different. Thus, in this case, there may be prepared a dither pattern for the forward scanning and a dither pattern for the backward scanning, individually.

In the above-described embodiments, a so-called multi-pass printing in which an image is formed in stages by multiple times of print scanning of the printing head while thinning out images of unit area on the image printing medium by a mask pattern prepared in advance may be performed. In the multi-pass printing, a conveyance operation of a shorter distance than the arrangement length of the nozzle array may be performed between the multiple times of print scanning, and the forward scanning and the backward scanning may be included in the multiple times of print scanning. That is, the images of unit area are printed while being affected by the various controls in the printing apparatus, and the degree of such effects and the moving direction of a dot are different in each unit area. Even in this case, as long as the factors affecting the printing position such as not only the above-described index pattern and the division driving but also the mask pattern, a conveyance amount, a carriage speed, and so on are clear, it is possible to prepare an appropriate extended pattern for each unit area. Consequently, it is possible to generate an appropriate dither pattern for each unit area.

Additionally, the present invention is not limited to the case of performing both the index development processing and the time-divisional driving. Even in a case of performing only either one of them, the dot dispersibility of the dither pattern is uneven on paper, and it is still possible to exert the effects of the present invention. Moreover, even in a case of performing neither the index development processing nor the time-divisional driving, it is allowable as long as the dot position determined in the quantization processing is moved due to any control performed after the quantization processing and the movement amount, or the number of the divided pixels (J pixels), and the position can be estimated.

In the above-described embodiments, in the series of processing described in FIG. 4, although it is described that the processing from S401 to S404 is performed by the image processing apparatus, and the index development processing of S405 is performed by the printing apparatus, it is needless to say that the present invention is not limited to this mode. All the processing from S401 to S405 may be performed by the image processing apparatus, or the whole processing may be performed by the printing apparatus.

The bit number (gradation number) of the data handled through the steps of FIG. 4 should not be limited to the above description as well. For example, in the color separation processing of S402, the 8-bit data of RGB may be extended to 16-bit data of CMYK. The type of the ink color used by the printing apparatus should not be limited to the above-described embodiments as well. In addition to the above-described four colors, spot color ink such as red, green, and blue may be used, and ink of light cyan, light magenta, and gray that have the same hue but different density from cyan, magenta, and black may be used. Otherwise, the printing apparatus may be a monochrome color type using only black. In any case, as long as the step of performing the quantization processing using the dither pattern is included, it is possible to exert the effects of the present invention.

Although the serial type ink jet printing apparatus as illustrated in FIG. 1 is described as an example in the above embodiments, a full-line type printing apparatus may be used for the present invention. Even with the full-line type printing apparatus, as long as the printing head performs the time-divisional driving, the dots printed by the individual nozzles are printed to be displaced in the conveyance direction of the printing medium. Thus, in the case of the full-line type printing apparatus, use of an extended pattern having the high resolution in the conveyance direction makes it possible to obtain effects similar to that of the above-described embodiments.

As described above, according to the above-described embodiments, it is possible to output an image with excellent dot dispersibility and reduced graininess even in a situation where the controls performed after the quantization processing affect the dot arrangement determined by the quantization processing.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-131987 filed Jul. 17, 2019, which is hereby incorporated by reference wherein in its entirety.

What is claimed is:

1. An image printing apparatus comprising:
a storing unit configured to store a dither pattern having a quantization resolution in which a plurality of thresholds are set corresponding to pixel positions;
a quantization unit configured to compare a threshold in the dither pattern, the threshold corresponding to a processing target pixel in image data, with a multi-value gradation value of the processing target pixel to generate quantization data having the quantization resolution; and
a control unit configured to perform a predetermined control in which an image is printed by moving a printing unit and a printing medium relative to each other in a predetermined direction, based on the quantization data generated by the quantization unit, at a printing resolution higher than the quantization resolution in at least one of the predetermined direction and a direction crossing the predetermined direction,
wherein the dither pattern is formed in line with the following steps and then stored in the storing unit:
a generation step of generating an extended pattern corresponding to the printing resolution, a part of a plurality of subpixels included in the extended pattern being determined as dot-arrangeable-subpixels in which dots are allowed to be printed and the other part of the plurality of subpixels included in the extended pattern being determined as dot-not-arrangeable-subpixels in which dots are not allowed to be printed according to the predetermined control;
a selecting step of selecting a number of the dot-arrangeable-subpixels which number corresponds to a predetermined gradation value from among the plurality of the dot-arrangeable-subpixels in the extended pattern, so that an arrangement of the selected dot-arrangeable-subpixels has a predetermined dispersibility; and
a setting step of specifying, from a plurality of pixels in the dither pattern having the quantization resolution, pixels which correspond to the dot-arrangeable-subpixels selected in the extended pattern having the printing resolution, and setting thresholds to the specified pixels.

2. The image printing apparatus according to claim 1, wherein the predetermined control is a control to determine whether or not to print a dot in each of the plurality of subpixels based on the quantization data and dot arrangement patterns prepared in advance, and
in the generation step, the extended pattern in which the dot-arrangeable-subpixels are determined based on the dot arrangement patterns is generated.

3. The image printing apparatus according to claim 1, wherein the predetermined control is a control in which a plurality of blocks obtained by dividing a plurality of printing elements capable of printing dots on the printing medium are driven at different divided timings with a higher resolution than the quantization resolution in the relative movement, and
in the generation step, the extended pattern in which the dot-arrangeable-subpixels are determined based on the number of the blocks and the timings of driving the respective blocks is generated.

4. The image printing apparatus according to claim 1, wherein a range of the thresholds arranged in the dither pattern and a range of values the gradation value can take are equal, and
in the quantization unit, a printing of a dot in the processing target pixel is set in a case where the gradation value of the processing target pixel is greater than the threshold of a corresponding pixel of the dither pattern, and a not-printing of a dot in the processing target pixel is set in a case where the gradation value of the processing target pixel is smaller than the threshold of the corresponding pixel of the dither pattern.

5. The image printing apparatus according to claim 1, wherein a gradation range of the gradation values is divided into a plurality of gradation areas, and the dither pattern is formed for each of the plurality of gradation areas.

6. The image printing apparatus according to claim 5, wherein a first dither pattern corresponding to a first area of the plurality of gradation areas is formed, and thereafter a second dither pattern corresponding to a second area of the plurality of gradation areas that is continuous from the first area and has a higher gradation value of that of the first area is formed by using the extended pattern used to form the first dither pattern.

7. The image printing apparatus according to claim 5, wherein a first dither pattern corresponding to a first area of the plurality of areas is formed, and a second dither pattern corresponding to a second area of the plurality of areas that is continuous from the first area and has a higher gradation value of that of the first area is formed without using the extended pattern used to form the first dither pattern.

8. The image printing apparatus according to claim 1, wherein in the setting step, an evaluation value indicating the dispersibility of each of the dot-arrangeable subpixels included in the extended pattern is calculated, and the thresholds are set to the pixels of the dither pattern while being associated with the evaluation values of the corresponding dot-arrangeable-subpixels.

9. The image printing apparatus according to claim 1, wherein the setting step includes:

a selection step of selecting a predetermined number of the dot-arrangeable-subpixels from the dot-arrangeable subpixels included in the extended pattern;

a calculation step of calculating an evaluation value indicating dot dispersibility of each of the selected dot-arrangeable subpixels;

a changing step of changing the selection of the dot-arrangeable subpixels in the extended pattern based on the evaluation values to obtain higher dot dispersibility in the extended pattern; and a setting step of setting the thresholds to the pixels of the dither pattern corresponding to the dot-arrangeable subpixels in the changed extended pattern.

10. The image printing apparatus according to claim 1, wherein in the setting step, the thresholds are set to the pixels of the dither pattern to obtain the predetermined dispersibility having blue noise properties.

11. A non-transitory computer-readable storage medium which stores a program executable by a processor of an image printing apparatus, the printing apparatus storing a dither pattern having a quantization resolution in which a plurality of thresholds are set corresponding to pixel positions, the program comprising code to execute:

a quantization step of comparing a threshold in the dither pattern which threshold corresponds to a processing target pixel in image data with a multi-value gradation value of the processing target pixel to generate quantization data having the quantization resolution; and performing a predetermined control in which an image is printed by moving a printing unit and a printing medium relative to each other in a predetermined direction, based on the quantization data generated by the quantization step, at a printing resolution higher than the quantization resolution in at least one of the predetermined direction and a direction crossing the predetermined direction, and wherein the dither pattern is formed in line with the following steps and then stored:

a generation step of generating an extended pattern corresponding to the printing resolution, a part of a plurality of subpixels included in the extended pattern being determined as dot-arrangeable-subpixels in which dots are allowed to be printed and the other part of the plurality of subpixels included in the extended pattern being determined as dot-not-arrangeable-subpixels in which dots are not allowed to be printed according to the predetermined control;

a selecting step of selecting a number of dot-arrangeable-subpixels which number corresponds to a predetermined gradation value from among a plurality of the dot-arrangeable-subpixels in the extended pattern, so that an arrangement of the selected dot-arrangeable-subpixels has a predetermined dispersibility; and a setting step of specifying, from a plurality of pixels in the dither pattern having the quantization resolution, pixels which correspond to the dot-arrangeable-subpixels selected in the extended pattern having the printing resolution, and setting thresholds to the specified pixels.

12. The non-transitory computer-readable storage medium according to claim 11, wherein the predetermined control is a control to determine whether or not to print a dot in each of the plurality of subpixels based on the quantization data and dot arrangement patterns prepared in advance, and in the generation step, the extended pattern in which the dot-arrangeable-subpixels are determined based on the dot arrangement patterns is generated.

13. The non-transitory computer-readable storage medium according to claim 11, wherein the predetermined control is a control in which a plurality of blocks obtained by dividing a plurality of printing elements capable of printing dots on the printing medium are driven at different divided timings with a higher resolution than the quantization resolution in the relative movement, and in the generation step, the extended pattern in which the dot-arrangeable-subpixels are determined based on the number of the blocks and the timings of driving the respective blocks is generated.

14. The non-transitory computer-readable storage medium according to claim 11, wherein a range of the thresholds arranged in the dither pattern and a range of values the gradation value can take are equal, and in the quantization unit, a printing of a dot in the processing target pixel is set in a case where the gradation value of the processing target pixel is greater than the threshold of a corresponding pixel of the dither pattern, and a not-printing of a dot in the processing target pixel is set in a case where the gradation value of the processing target pixel is smaller than the threshold of the corresponding pixel of the dither pattern.

15. The non-transitory computer-readable storage medium according to claim 11, wherein a gradation range of the gradation values is divided into a plurality of gradation areas, and the dither pattern is formed for each of the plurality of gradation areas.

16. The non-transitory computer-readable storage medium according to claim 15, wherein a first dither pattern corresponding to a first area of the plurality of gradation areas is formed, and thereafter a second dither pattern corresponding to a second area of the plurality of gradation areas that is continuous from the first area and has a higher gradation value of that of the first area is formed by using the extended pattern used to form the first dither pattern.

17. The non-transitory computer-readable storage medium according to claim 15, wherein a first dither pattern corresponding to a first area of the plurality of areas is formed, and a second dither pattern corresponding to a second area of the plurality of areas that is continuous from the first area and has a higher gradation value of that of the first area is formed without using the extended pattern used to form the first dither pattern.

18. The non-transitory computer-readable storage medium according to claim 11, wherein in the setting step, an evaluation value indicating the dispersibility of each of the dot-arrangeable-subpixels included in the extended pattern is calculated, and the thresholds are set to the pixels of the dither pattern while being associated with the evaluation values of the corresponding dot-arrangeable-subpixels.

19. The non-transitory computer-readable storage medium according to claim 11, wherein the setting step includes:

a selection step of selecting a predetermined number of the dot-arrangeable-subpixels from the dot-arrangeable-subpixels included in the extended pattern;

a calculation step of calculating an evaluation value indicating dot dispersibility of each of the selected dot-arrangeable-subpixels;

a changing step of changing the selection of the dot-arrangeable-subpixels in the extended pattern based on the evaluation values to obtain higher dot dispersibility in the extended pattern; and a setting step of setting the thresholds to the pixels of the dither pattern corresponding to the dot-arrangeable-subpixels in the changed extended pattern.

20. The non-transitory computer-readable storage medium according to claim 11, wherein in the setting step, the thresholds are set to the pixels of the dither pattern to obtain the predetermined dispersibility having blue noise properties.

* * * * *